United States Patent

[11] 3,623,749

| [72] | Inventor | Falle R. Jensen<br>44 W. Del Amo Blvd., Long Beach, Calif. 90805 |
|---|---|---|
| [21] | Appl. No. | 888,347 |
| [22] | Filed | Dec. 29, 1969 |
| [45] | Patented | Nov. 30, 1971 |

[54] PORTABLE BICYCLE
6 Claims, 12 Drawing Figs.

[52] U.S. Cl. .................................................. 280/278, 280/287
[51] Int. Cl. .................................................. B62k 15/00
[50] Field of Search .......................................... 280/278, 287, 279, 276

[56] References Cited
UNITED STATES PATENTS

| 3,513,926 | 5/1970 | Paget | 280/287 X |
| 1,610,016 | 12/1926 | Kuchta | 280/278 |
| 2,768,836 | 10/1956 | Hilber | 280/279 X |
| 3,354,975 | 11/1967 | Stuart | 280/278 X |

FOREIGN PATENTS

| 1,084,159 | 6/1960 | Germany | 280/278 |
| 1,112,828 | 5/1968 | Great Britain | 280/287 |

*Primary Examiner*—Kenneth H. Betts
*Attorney*—Harold A. Dreckman

ABSTRACT: A portable bicycle of substantially U-shaped structure including a front wheel assembly removably attached to a bottom assembly, a seat assembly pivotally affixed to the bottom assembly, and a clamp joining the bottom assembly and front wheel assembly permitting the front wheel assembly to be removably attached substantially parallel to the bottom assembly.

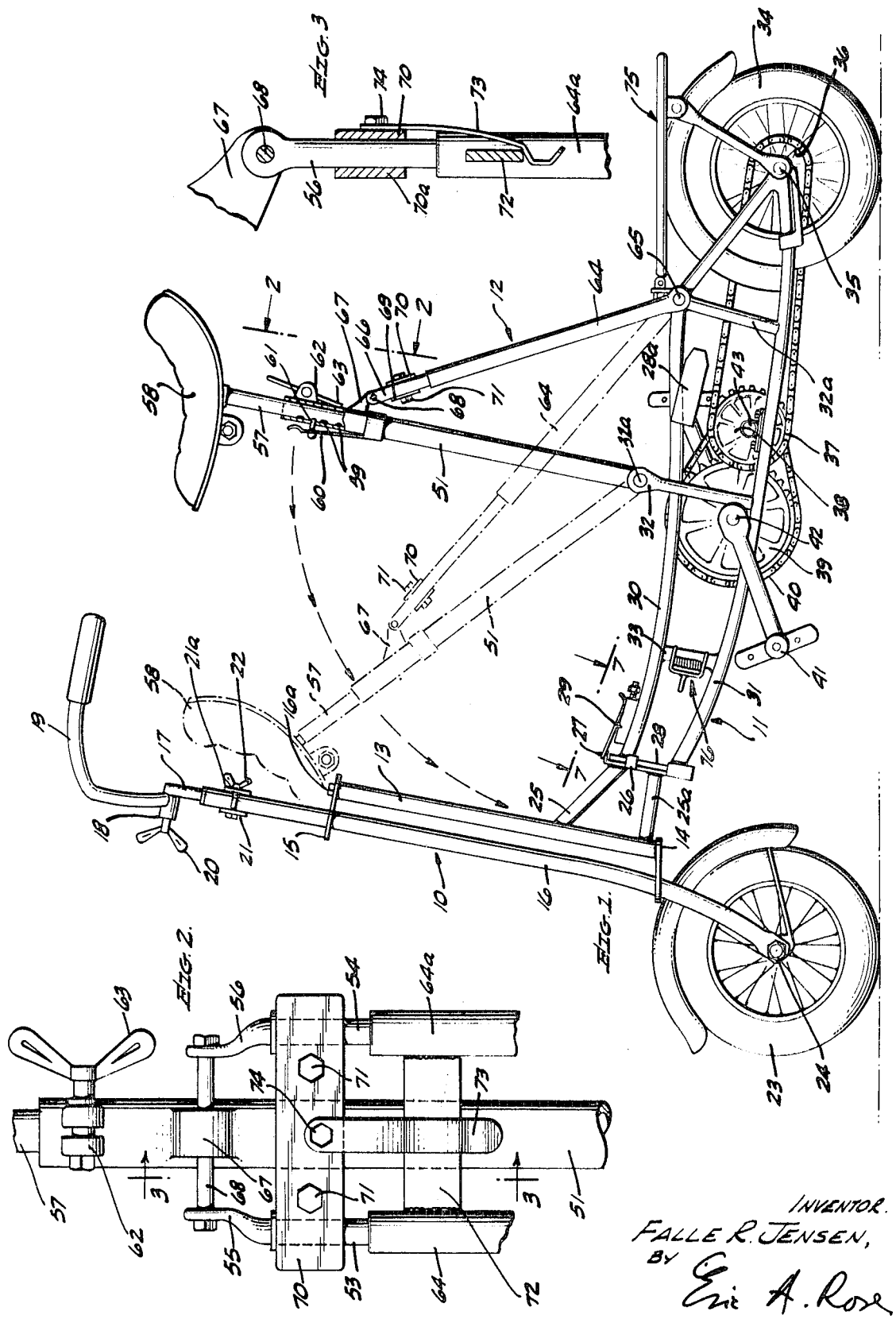

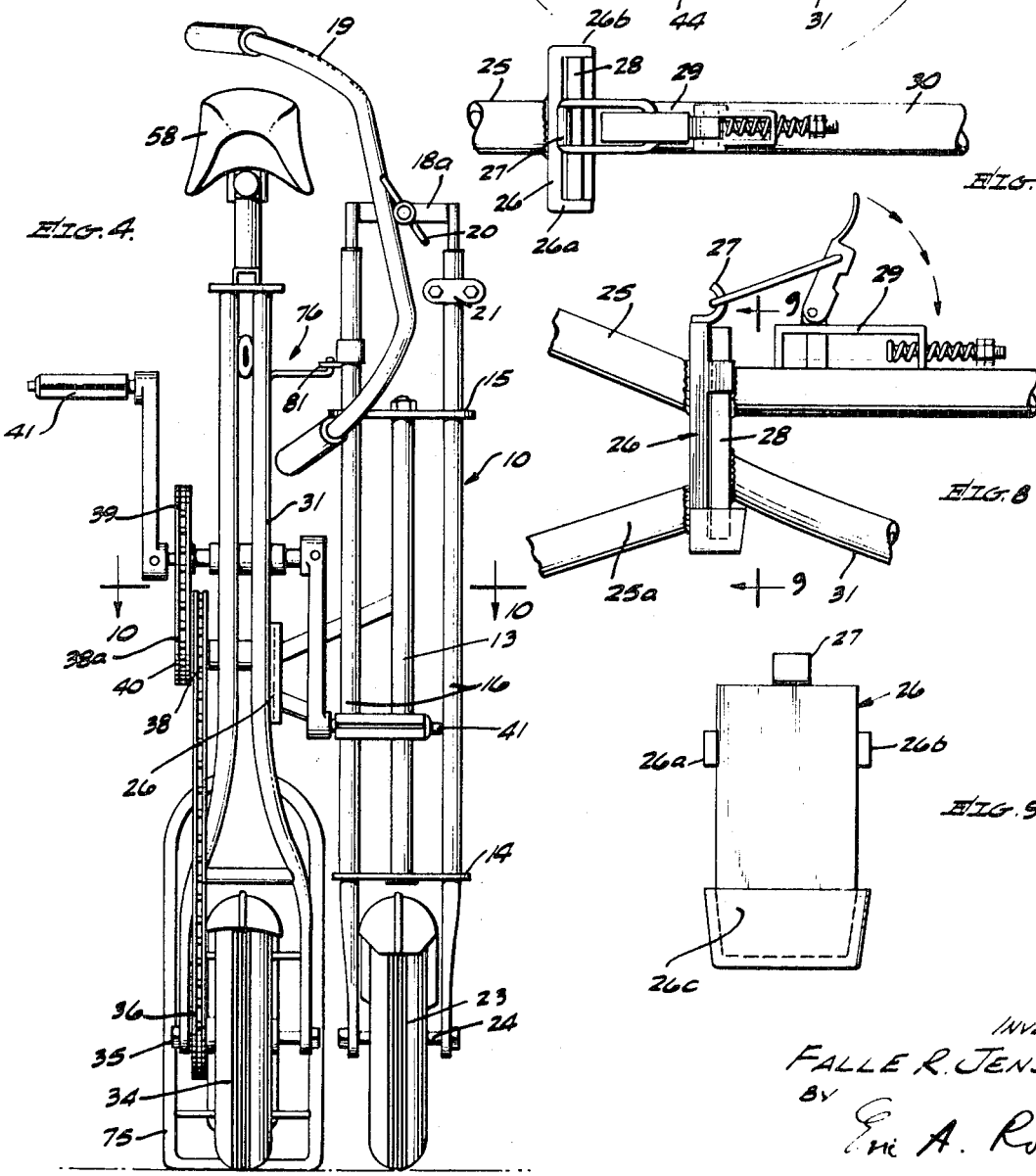

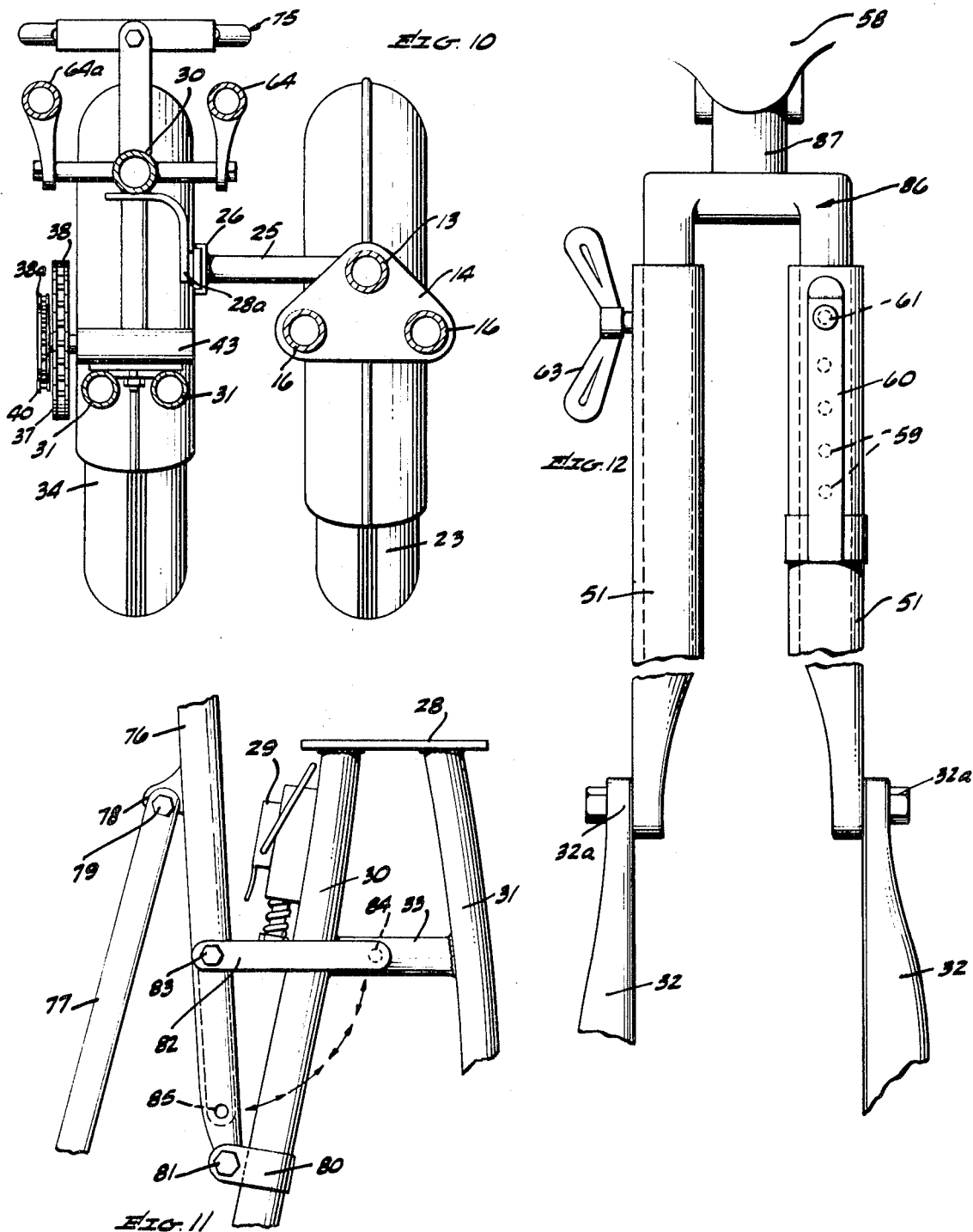

PORTABLE BICYCLE

My invention relates to improvements in a portable bicycle, and particularly to a bicycle permitting the separation of operating parts and the assembly thereof into a compact unit; and the objects of my invention are, first, to provide a bicycle having a front wheel assembly which may be affixed parallel to a bottom tube assembly and permitting the pivotal movement of the seat tube substantially parallel to the bottom assembly so as to provide a compact unit which may be easily transported in a portable manner; second, to provide a portable bicycle in which operating parts may be separated and removably attached to each other in a sturdy construction when in operation, and when folded has no projecting parts which would require storage space in excess of the space required by the compacted vehicle; third, to provide a novel method for the folding of a bicycle comprising a front wheel assembly which can be removably affixed parallel to a bottom assembly and having a seat assembly which may be pivotally moved from a normal substantially vertical position to a position substantially parallel to the bottom assembly and removably affixed thereto; fourth, to provide a portable bicycle permitting the disassembly of a U-shaped structure into a plurality of separate elements detachably connected to each other for easy storage; and, fifth, to provide facilities in a bicycle having a substantially U-shaped structure comprised of a number of elements severable from each other and to be attached to each other to form a compact unit which can be stored or transported easily or wheeled about in a shopping cart manner when disassembled.

Additional objects, together with further advantages derived in utilizing the present invention, will become apparent from the following detailed description thereof taken together with the accompanying drawing forming part of the specification, in which:

FIG. 1 is a side elevational view of my portable bicycle when in use;

FIG. 2 is an enlarged fragmentary elevational view of the seat locking mechanism, taken on line 2—2 of FIG. 1;

FIG. 3 is an enlarged fragmentary view partially in section, of the locking mechanism taken on line 3—3 of FIG. 2;

FIG. 4 is a fragmentary front elevational view of my invention in its compacted position;

FIG. 5 is an enlarged fragmentary view partially in section showing the upper attachment of the seat tube assembly to the bottom tube assembly when the bicycle is in the compacted position;

FIG. 6 is an enlarged fragmentary view, partially in section of the adjustable center sprocket wheel of the bicycle;

FIG. 7 is an enlarged fragmentary top view of the spring-loaded clamp taken on line 7—7 of FIG. 1;

FIG. 8 is an enlarged fragmentary side elevational view of the spring-loaded clamp, shown in FIG. 7;

FIG. 9 is a fragmentary enlarged view of the bracket shown on line 9—9 of FIG. 8;

FIG. 10 is an enlarged fragmentary plan view of the lower part of my invention in its compacted form taken on line 10—10 of FIG. 4;

FIG. 11 is an enlarged fragmentary elevational view of a modified form of the seat tube assembly of the bicycle to the bottom tube assembly and showing the attachment of the seat tube assembly to the bottom tube assembly in its compacted form, viewed from the left side of the bicycle; and, FIG. 12 is an enlarged fragmentary front elevational view of a modified form of my seat tube assembly.

Similar numerals refer to similar parts throughout the several views.

My invention comprises a bicycle consisting of a frame of general U-shaped form, including the front wheel assembly, 10, and the seat tube assembly, 12, held in spaced relation by the bottom tube assembly, 11.

The front wheel assembly, 10, comprises a head tube, 13, substantially triangularly shaped steering flanges, 14 and 15, attached to and held in fixed position by the steering column, 16a. Front forks, 16, extend through openings provided in the flanges, 14, 15, and parallel telescoping tubes, 17, 17, are movably disposed within the front forks, 16, and connected by a horizontal bar, 18a. A threaded cylinder, 18, is affixed to the center of the bar, 18a, and handlebars, 19, are integrally attached thereto. A wingbolt, 20, is threadedly disposed within the cylinder 18.

A clamp comprising two rectangular bars, 21, 21a, is disposed below the telescoping tubes, 17, 17, upon one of the front forks, 16, and held in position by wingbolts, 22, 22, permitting pressure to be exerted against the outside tubular walls of the front forks, 16, causing the telescoping tubes, 17, 17, to be fixed in position within the front forks, 16, 16.

A front wheel, 23, is attached between the front forks, 16, by a conventional hub, 24.

Braces, 25, 25a, are attached to the lower portion of the head tube, 13, extending rearwardly therefrom, and are rigidly affixed thereto and to an envelope support, 26, disposed substantially vertically and parallel to the head tube, 13.

The envelope support, 26, comprises a substantially rectangular vertical plate with a narrowed lower end having angle pieces, 26a, 26b, rigidly affixed one on each side thereof, and having an envelope forming a pocket, 26c, affixed to the narrowed lower portion. A hooked projection, 27, is integrally affixed to the top of the envelope support, 26.

The bottom tube assembly, 11, includes a support plate, 28, being substantially rectangular in form and having a narrowed lower portion suitable to rest in the pocket, 26c, of the envelope support, 26, removably positioned within the envelope support, 26. Attached thereto, and extending rearwardly therefrom, is the upper bottom tubular support member, 30, attached to the center of the top portion of the support plate, 28, and a pair of lower bottom tubular support members, 31, attached to the lower portion of the support plate, 28, in substantially horizontal parallel alignment with each other.

The upper bottom tubular support member, 30, and the lower bottom tubular support members, 31, are held in spaced relation to each other by a strut, 33, rigidly affixed between the support members, 31, a pair of substantially vertical head tube support brackets, 32, rigidly affixed to the upper and lower support members, 30, 31, and a support strut, 32a, rigidly affixed between said support members, 31. A spring-loaded latch mechanism, 29, is rigidly mounted upon the forward end of the upper tubular support member, 30, preventing the vertical movement of the support plate, 28, from the envelope support, 26, and being latched to the hooked projection, 27, forming part of the envelope support, 26.

The rearward end of support members, 31, form the hub, 35, for the free rear wheel, 34, and the rear sprocket wheel, 36. The main sprocket wheel, 39, is affixed adjacent to the pair of lower tubular support members, 31, in front of the seat tube support brackets, 32. Pedals, 41, are attached to cranks disposed about the shaft, 42, of the main sprocket wheel, 39.

A center sprocket wheel, 38, and center gear, 38a, are disposed about the center axle, 43, adjacent to the lower tubular support members, 31, and are positioned between the main sprocket wheel, 39, and the rear sprocket wheel, 36, the center axle, 43, being positioned in a bearing, 43a, which is mounted on the bearing support plate, 45.

A spacer bar, 46, is rigidly mounted upon the lower tubular support members, 31, and is provided with longitudinally disposed slots, 47, 48.

A backplate, 44, is positioned below the spacer bar, 46, and the bearing support plate, 45, is slidably disposed on the spacer bar, 46. The bearing support plate, 45, and the backplate, 44, are connected through the slots 47, 48, by suitable bolts, 49, 50, of the bearing support plate, 45, may be adjusted laterally within the limits of the longitudinal slots, 47, 48.

A forward chain, 40, is disposed about the main sprocket wheel, 39, and the center gear, 38a, and a rear chain, 37, is disposed about the center sprocket wheel, 38, and the rear sprocket wheel, 36.

Longitudinal movement of the bearing support plate, 45, will permit a limited adjustment of the chain tension.

The gear ratio may be determined depending upon the use of the bicycle.

A support plate, 28a, identical in shape to the support plate, 28, affixed to the forward end of the bottom tube assembly, 11, is rigidly attached to the upper bottom tubular support member, 30, in substantially transverse alignment with the center sprocket wheel, 38, on the opposite side of the upper bottom support member, 30, the narrowed end of the support plate extending rearwardly.

The seat tube assembly generally comprises the seat tube, 51, and the back stays, 64, pivotally attached to the seat tube, 51, the seat tube 51, and the back stays, 64, being in turn pivotally attached to the bottom tube assembly, 11.

The seat tube, 51, is pivotally affixed between the seat tube support brackets, 32, by means of a pivotal shaft, 32a, affixed to the top portion and between the vertical seat tube support brackets, 32.

The upper end of the seat tube, 51, carries the saddle pin, disposed within the seat tube, and the upper end of the saddle pin, 57, carries the saddle, 58. A circular clamp, 62, disposed about the upper end of the seat tube, 51, is provided with a wingbolt, 63, permitting the locking of the saddle pin, 57, within the seat tube, 51.

A spring-type latch, 60, affixed to the upper end of the seat tube, 51, permits the locking of the saddle pin, 57, in various positions of saddle height by means of a pin, 61, attached to the clamp, 60, extending through an opening in the seat tube and one of a series of longitudinally disposed openings in the saddle pin, 57, which may be brought into alignment with the opening in the seat tube, 51.

A bracket, 67, extends to the rear of the upper portion of the seat tube, 51. The back stays, 64, are pivotally attached to the top of the support strut, 32a, by means of a pivot, 65, and the upper end of the back stays, is pivotally attached to the bracket, 67, of the seat tube, 51, by means of a pivot bolt, 68, extending through telescopic pins, 55, 56, slidably disposed within the back stays, 64, 64a.

Two compression members, 70, 70a, are movably affixed about the telescopic pins, 55, 56, by means of bolts, 71, 71. A spacer bar, 72, is mounted between the back stays, 64, 64a, near the top ends thereof, and a clamp, 73, affixed by a bolt, 74, to the outer compression member, 70, latches behind the lower end of the spacer bar, 72. A luggage rack, 75, is shown in the drawings as being affixed between the lower portion of the back stays, 64, 64a, and the rear wheel hub, 35.

A spring-loaded latch, 76, permits the connection of the bottom tube assembly, 11, to the front wheel assembly, 10, when my invention is in its compacted position.

The latch, 76, comprises a stationary bracket, 77, affixed to the strut, 33, by means of a bolt, 78, which is hinged to a latch finger, 79, carrying a vertical extension, 80, held normally at a right angle to the stationary bracket, 77, by means of a spring, 82, disposed about the hinge. A latch receiving bracket, 81, is affixed to the front fork, 16, in horizontal alignment with the hinge.

In operation, the bicycle is used in its conventional manner.

When it is decided to reduce the bicycle to its compacted form for the purpose of carrying it or storing it or moving it in cart fashion on its rear wheel, the spring-loaded latch, 29, is opened, releasing the support plate, 28, which can be slid upwardly from its resting place in the pocket, 26c, of the envelope support, 26. The envelope support, 26, is then disposed upon the support plate, 28a, affixed to the upper bottom tubular support member, 30, and the front wheel assembly is thereby aligned substantially parallel to the bottom tube assembly and removably affixed thereto.

The spring-loaded latch 76, is then depressed and attached to the latch receiving bracket, 81, affixed to the front forks, 16, securing the front wheel assembly, 10, thereby to the bottom tube assembly, 11.

The releasing of the latch, 73, affixed about the lower end of the spacer bar, 72, of the back stays, 64, 64a, permits the pivotal movement of the seat tube assembly, 12, about its points of pivotal attachment to the seat tube support brackets, 32, and support strut, 32a, respectively, permitting the folding of the seat tube assembly against the bottom tube assembly, 11.

If it is desired to secure the seat tube assembly to the bottom tube assembly, a latch similar to that illustrated in FIG. 11 and hereinafter described may be used. As illustrated in FIG. 11 of the drawing accompanying this specification, the seat tube may be differently attached to the frame of the bicycle by securing the seat tube, 76, to the upper bottom tubular support member, 30, by means of a clamp, 80, and a pivotal bolt, 81, and by pivotally attaching the back stays, 77, to the seat tube, 76, by means of a bracket, 78, and a pivotal bolt, 79. A pressure-type latch, 82, is then provided so as to connect the seat tube assembly in its folded position to the bottom tube assembly, 11, by securing the pressure-type latch, 82, to the seat tube, 76, by means of a pivotal bolt, 83, and extending a latch pin, 84, through a suitable opening in the strut, 33. If it is decided to disconnect the latch, 82, the pin, 84, is lifted from its position within the strut, 33, and disposed in a corresponding opening, 85, in the seat tube, 76, as shown in FIG. 11. The pressure-type latch, 82, illustrated in FIG. 11 of my drawing, may be used similarly with the bicycle shown in FIG. 1.

A further modification is illustrated in FIG. 12, wherein the saddle pin, 87, attached to the saddle, 58, is affixed to an inverted U-shaped pair of telescopic tubes, 86, disposed within the seat tubes, 51, 51, which are attached to the support strut, 32a, as shown in pivotal fashion, the saddle pin assembly being locked within the seat tubes, 51, 51, as heretofore illustrated in FIG. 1.

Handlebars, 18, may be disposed substantially 90° by use of the wing bolt, 20, and may be secured substantially vertically against the front forks, 16, or by the use of the wingbolts, 22, 22, attached to the rectangular bars, 21, 21a, the telescoping tubes, 17, 17, may be removed from the front forks, 16, and the handlebar may be transported as a separate unit when the bicycle is in its compacted position.

While specific forms of my invention have been illustrated in the accompanying drawings, it is understood that additional modifications may be embodied in my device without departing from the spirit of my invention.

I claim:

1. A front wheel assembly, an envelope support rigidly affixed to the front wheel assembly, a bottom assembly removably attached to the envelope support and a seat assembly pivotally joined to the bottom assembly, and means attached to the bottom tube assembly removably connecting the envelope support thereto causing the front wheel assembly to become removably affixed to the bottom tube assembly in spaced substantially parallel relation thereto.

2. A portable bicycle including a front wheel assembly having front forks, telescoping tubes slidably disposed within the front forks, clamping means permitting the locking of the telescopic tubes within the front forks, handlebars movably affixed to the telescopic tubes, means to lock the handlebars in position upon the telescopic tubes, a head tube, a steering column movably disposed within said head tube, steering flanges slidably disposed upon and below said head tube and rigidly affixed to the steering column and to the front forks, a plurality of braces attached to the head tube and extending rearwardly therefrom, an envelope support rigidly affixed to said braces and disposed substantially vertically and parallel to the head tube.

3. A portable bicycle as described in claim 2, including a bottom tube assembly having an upper bottom tubular support member, a plurality of lower bottom tubular support member, a plurality of lower bottom tubular support members and means affixed to and between said upper tubular support member and bottom tubular support members holding the upper bottom tubular support member and lower bottom tubular support members in fixed spaced relation to each other, a support plate substantially rectangular in form and having a narrowed lower portion adapted to be slidably disposed within the envelope support rigidly affixed to the forward end of the upper bottom tubular support member and lower bottom tubular support members, a support plate substantially rectangular in form and having a narrowed end portion suitable to be slidably disposed within the envelope support rigidly substantially horizontally affixed to the upper tubular support member, and locking means suitable to hold the front wheel assembly in spaced relation to the bottom tube assembly and substantially parallel thereto.

4. A portable bicycle as described in claim 3, including a seat tube assembly having a seat tube, means pivotally affixing said seat tube to the bottom tube assembly, a saddle pin slidably disposed within the seat tube, a spring-type latch permitting the height adjustment of the saddle pin, a saddle rigidly affixed to the top of the saddle pin, a bracket integrally affixed to the seat tube and extending rearwardly therefrom, back stays, telescopic pins slidably disposed within the back stays, pivotal means rotatably affixing the back stays to the bottom tube assembly, a pivot bolt rigidly affixed to the telescopic pins and rotatably disposed within the bracket, adjustable locking means disposed to and between the telescopic pins, a spacer bar rigidly affixed to and between the back stays, latching means affixed to the locking means and removably disposed about the spacer bar, and latching means suitable for latching the seat tube assembly to the bottom tube assembly in its compacted form.

5. A portable bicycle of substantially U-shaped structure including a front wheel assembly, a bottom assembly, coupling means disposed between the front wheel assembly and bottom assembly, a seat assembly pivotally affixed to the bottom assembly, means securing the seat assembly to the bottom assembly, including locking means adapted to lock the front wheel assembly to the bottom assembly in substantially parallel spaced relation to each other, said front wheel assembly including spaced forks, and telescopic tubes and handlebars removably affixed to said forks.

6. A portable bicycle including a bottom assembly, a seat assembly pivotally affixed to the bottom assembly at horizontally spaced points, a front wheel assembly including braces attached to the lower portion thereof and extending rearwardly therefrom, an envelope support affixed thereto and to the ends of the braces and disposed substantially vertically, a bottom assembly including a support plate affixed to the front end thereof and disposed substantially vertically within the envelope support and in slidable relation thereto, and means pivotally attaching the seat assembly to the bottom assembly.

* * * * *